(12) United States Patent
Suzuki

(10) Patent No.: US 7,373,139 B2
(45) Date of Patent: *May 13, 2008

(54) UPDATE NOTIFICATION SYSTEM, UPDATE MONITORING APPARATUS, MOBILE COMMUNICATION TERMINAL, INFORMATION PROCESSING APPARATUS, CONTENTS ACQUISITION INSTRUCTING METHOD, CONTENTS ACQUIRING METHOD, AND PROGRAM STORING MEDIUM

(75) Inventor: Naoya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/455,701

(22) Filed: Jun. 20, 2006

(65) Prior Publication Data

US 2006/0240849 A1    Oct. 26, 2006

Related U.S. Application Data

(63) Continuation of application No. 09/852,204, filed on May 9, 2001, now Pat. No. 7,103,353.

(30) Foreign Application Priority Data

May 11, 2000    (JP)    ............................. 2000-139171

(51) Int. Cl.
*H04Q 7/20*    (2006.01)
(52) U.S. Cl. ................. 455/414.2; 455/414.3; 455/456; 455/418; 455/419; 709/227; 709/224
(58) Field of Classification Search ................ 455/418, 455/419, 412.2, 413, 466, 414.3, 414.2; 717/168, 717/169, 170, 173
See application file for complete search history.

(56) References Cited

U.S. PATENT DOCUMENTS

| | | | |
|---|---|---|---|
| 4,972,457 A | | 11/1990 | O'Sullivan |
| 6,055,570 A | * | 4/2000 | Nielsen ...................... 709/224 |
| 6,138,158 A | * | 10/2000 | Boyle et al. ................ 709/225 |
| 6,144,849 A | | 11/2000 | Nodoushani et al. |
| 6,198,946 B1 | * | 3/2001 | Shin et al. .................. 455/561 |
| 6,360,256 B1 | | 3/2002 | Lim |
| 6,735,434 B2 | | 5/2004 | Criss et al. |
| 7,016,944 B1 | * | 3/2006 | Meyer et al. ............... 709/218 |
| 2002/0123335 A1 | | 9/2002 | Luna et al. |

* cited by examiner

*Primary Examiner*—William Trost
*Assistant Examiner*—Julio Perez
(74) *Attorney, Agent, or Firm*—Oblon, Spivak, McClelland, Maier & Neustadt, P.C.

(57) ABSTRACT

An update notification system is capable of efficiently acquiring updated contents. Provided are an update monitoring apparatus 6 for monitoring contents stored in a server 7 for their update situations to transmit an update notification signal when the contents is updated, a mobile communication terminal 3 for notifying the user that the contents have been updated, in response to receipt of the update notification signal and for transmitting an acquisition instructing signal for instructing acquisition of the updated contents, and an information processing apparatus 2 for downloading the updated contents from the server 7 in response to receipt of the acquisition instructing signal.

7 Claims, 6 Drawing Sheets

| | MONITORED URL | LATEST UPDATE DATE /TIME INFORMATION | UPDATE NOTICE DESTINATION |
|---|---|---|---|
| | www.OXOX.co.jp/index.html | 2000/01/13 09:00:00 | 090-1111-XXXX |
| | www.OOOXXX.com/main.html | 2000/02/03 23:45:00 | 090-2222-XXXX |
| | www.XXOO.co.jp/news/today.html | 2000/02/13 18:17:05 | 090-1234-XXXX |
| | www.XOXO.go.jp/topics.html | 2000/01/01 00:00:00 | 090-5678-XXXX |

UPDATE NOTIFICATION SYSTEM, UPDATE MONITORING APPARATUS, MOBILE COMMUNICATION TERMINAL, INFORMATION PROCESSING APPARATUS, CONTENTS ACQUISITION INSTRUCTING METHOD, CONTENTS ACQUIRING METHOD, AND PROGRAM STORING MEDIUM

CROSS-REFERENCE TO RELATED APPLICATIONS

This application is a Continuation Application of Ser. No. 09/852,204 filed May 9, 2001 now U.S. Pat. No. 7,103,353 and claims the benefit of priority from the prior Japanese Patent Application No. 2000-139171, filed May 11, 2000.

BACKGROUND OF THE INVENTION

1. Field of the Invention

The present invention relates to an update notification system, an update monitoring apparatus, a mobile communication terminal, an information processing apparatus, a contents acquisition instructing method, a contents acquiring method, and a program storing medium, and more particularly, is suitably applied to an update notification system which can monitor contents on a network to acquire only updated contents.

2. Description of the Related Art

In a personal computer, when a desired uniform resource locator (URL) is entered with a web browser program running thereon, a home page server indicated by the entered URL is accessed through the Internet based on the web browser program to download home page data from the home page server and display the home page data on a monitor, thereby allowing a home page on the Internet to be viewed. Also, the contents of the home page data displayed by the personal computer is regularly or irregularly updated.

In the personal computer configured as described above, it cannot be known whether or not the contents of home page data have been updated unless the home page server is accessed. Therefore, acquisition of the latest home page data requires frequent accesses to the home page server to confirm whether the home page has been updated, thereby giving rise to a problem that tedious operations are imposed to the user.

SUMMARY OF THE INVENTION

In view of the foregoing, an object of this invention is to provide an update notification system, an update monitoring apparatus, a mobile communication terminal, an information processing apparatus, and a contents acquiring method which are capable of efficiently acquiring the latest updated contents.

The foregoing object and other objects of the invention have been achieved by the provision of an update monitoring apparatus comprising: a storing means for storing data indicating at least locations of contents to be monitored and a number of a mobile communication terminal which is informed of update of the contents; a monitoring processing means for monitoring a update state of the contents stored in a prescribed server; and a notifying means for transmitting an update notification signal indicating that the contents have been updated, to the mobile communication terminal over a radio communication circuit network.

Further, a mobile communication terminal comprises: a radio communication means for connecting by radio to a radio communication circuit network to perform communications; a notifying means for notifying a user with an update notification signal that contents to be monitored, received over the radio communication circuit network, have been updated; and a transmitting means for transmitting an acquisition instructing signal to instruct acquisition of the contents, to a prescribed information processing apparatus.

Furthermore, a mobile communication terminal comprises: a radio communication means for connecting by radio to a radio communication circuit network to perform communications; a notifying means for notifying a user with an update notification signal that contents to be monitored, received over the radio communication circuit network, have been updated; and an acquiring means for acquiring the contents stored in a prescribed server based on the update notification signal.

Furthermore, an information processing apparatus comprises: a receiving means for receiving an acquisition instructing signal to instruct acquisition of contents which is transmitted from a mobile communication terminal; and an acquiring means for acquiring the contents from a prescribed server based on the acquisition instructing signal.

Furthermore, an update notification system comprises: a mobile communication terminal for notifying a user with an update notification signal that contents to be monitored that is received by connecting by radio to a radio communication circuit network, and for transmitting an acquisition instructing signal to instruct acquisition of the contents, to a prescribed information processing apparatus; an update monitoring apparatus for storing data indicating at least locations of the contents to be monitored and a number of the mobile communication terminal which is informed of update of the contents, and for transmitting the update notification signal to the mobile communication terminal over the radio communication circuit network when the contents stored in a prescribed server is updated; and an information processing apparatus for receiving the acquisition instructing signal to instruct acquisition of the content, transmitted from the mobile communication terminal, and for acquiring the contents from the prescribed server based on the acquisition instructing signal.

Furthermore, an update notification system comprises: a mobile communication terminal for notifying a user with an update notification signal that contents to be monitored which is received by connecting by radio to a radio communication circuit network, have been updated, and for acquiring the contents stored in a prescribed server over the radio communication circuit network; and an update monitoring apparatus for transmitting the update notification signal to the mobile communication terminal over the radio communication circuit network based on update of the contents stored in the server.

Furthermore, a contents acquisition instructing method comprises: a receiving step of receiving an update notification signal to make a notice that contents stored in a prescribed server have been updated; a notifying step of notifying a user with the update notification signal received, that the contents have been updated; and a transmitting step of transmitting an acquisition instructing signal to instruct acquisition of the contents updated, to a prescribed information processing apparatus.

Furthermore, a program storing medium comprises: a receiving step of receiving an update notifying signal to make a notice that contents stored in a prescribed server have been updated; a notifying step of notifying a user with the update notifying signal received that the contents have been updated; and a transmitting step of transmitting an acquisition instructing signal to instruct acquisition of the contents updated, to a prescribed information processing apparatus.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Configuration of Update Notification System

Figure 1:
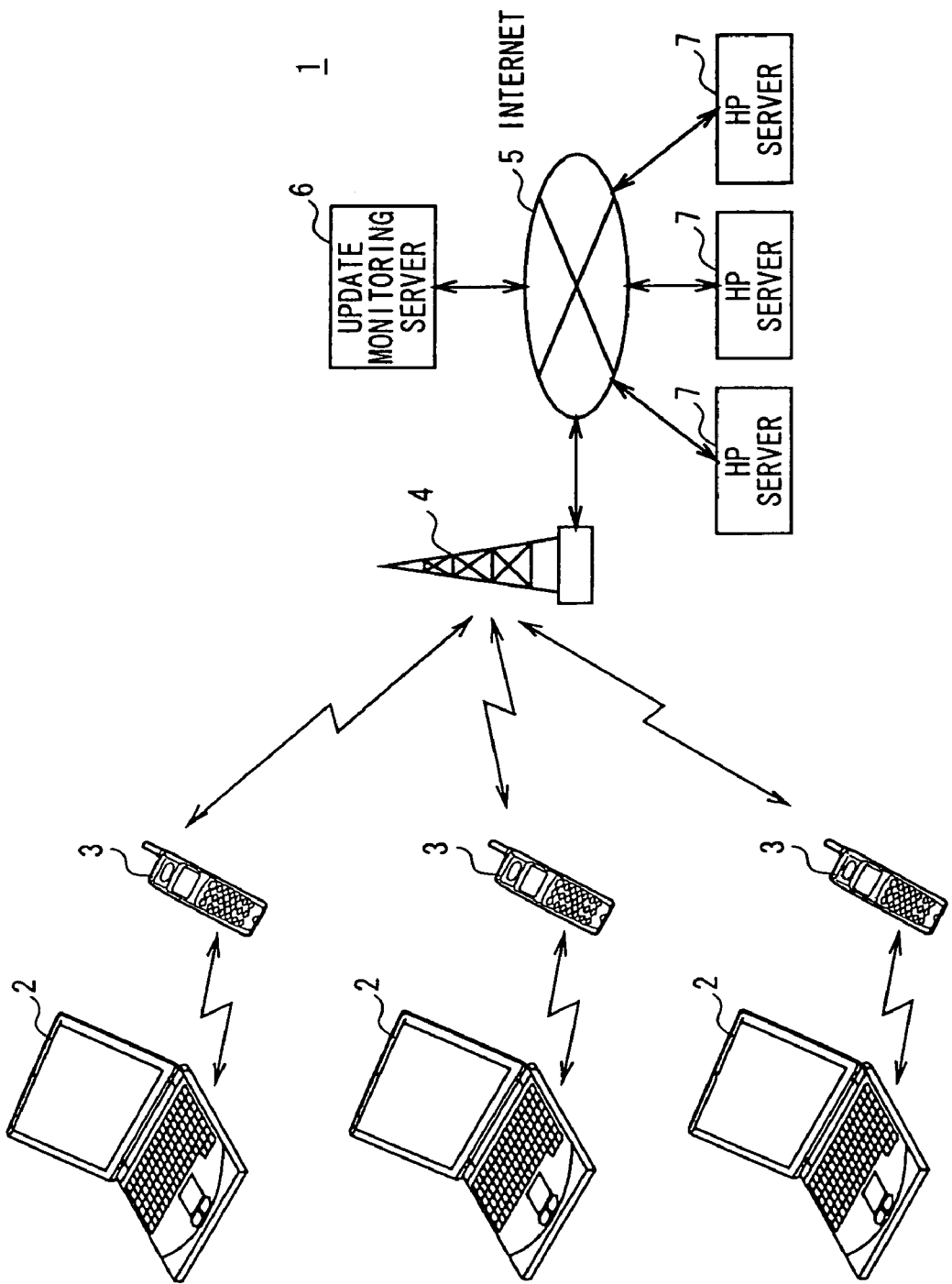
FIG. 1 is a schematic diagram generally illustrating the configuration of an update notification system according to the present invention.

In FIG. 1, an update notification system, to which the present invention is applied, is generally designated by reference numeral 1, wherein a digital mobile telephone 3 is wirelessly connected to a base station 4 so that it can make audio communications with another mobile telephone or a wired telephone (not shown) connected to a public network through the base station 4.

The digital mobile telephone 3 can also make data communications with a variety of servers such as an update monitoring server 6, a home page server 7 and so on connected to the Internet 5, or with a variety of communication devices such as information processing apparatus (not shown) including a personal computer, PDA and so on.

Further, a notebook type personal computer (hereinafter referred to as the "note personal computer") 2 and a digital mobile telephone 3 can communicate with each other in accordance with a wireless communication scheme conforming to Bluetooth (trademark) which is a short distance wireless communication standard, thereby enabling the note personal computer 2 to communicate data with a variety of communication devices including the update monitoring server 6, the home page server 7 and so on connected to the Internet 5 through a nearby digital mobile telephone 3.

Here, Bluetooth is a short distance wireless data communication standard which has been standardized by Bluetooth Special Interest Group (SIG), a standardization organization, wherein 79 channels having a bandwidth of 1 MHz are set in a 2.4 MHz industrial scientific medical (ISM) band, and a data transmission is carried out at a data transmission rate of 1 Mbit/second (effectively 721 kbit/second) over 10 m using a spread spectrum communication scheme in accordance with the frequency hopping which switches channels 1600 times per second.

Each of the note personal computers 2 transmits update monitoring setting information comprised of URL of a monitored home page, the contents of which the user wishes to monitor with respect to their update situations (referred to as the "monitored URL"), and a telephone number of a digital mobile telephone 3 which is the destination of an update notification message for notifying that the monitored home page has been updated (referred to as the "update notification destination number"), to the update monitoring server 6 through a nearby digital mobile telephone 3.

The update monitoring server 6, which functions as an update monitoring apparatus, accesses each home page server 7 at a predetermined timing based on the results of totalized update monitoring setting information transmitted from the respective note personal computers 2 to examine update situations of the respective monitored home pages, and, when a monitored home page has been updated, transmits an update notification message to a destination digital mobile telephone 3 corresponding to the updated home page.

Upon receipt of the update notification message, the digital mobile telephone 3, which functions as a mobile communication terminal, displays the contents of the update notification message on a display unit to make the user recognize that the monitored home page has been updated. Then, the digital mobile telephone 3 controls the personal computer 2, as an information processing apparatus, as required, to download the updated monitored home page.

(1-1) Configuration of Update Monitoring Server

Figures 2, 3:
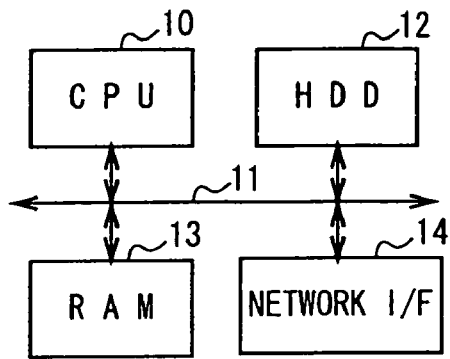
FIG. 2 is a block diagram illustrating the circuit configuration of an update monitoring server.
FIG. 3 is a table showing the data structure for an update monitoring table.

As illustrated in FIG. 2, the update monitoring server 6 has a configuration in which a hard disk drive 12, a random access memory (RAM) 13, and a network interface 14 are connected to a central processing unit (CPU) 10 through a bus 11 for totally controlling a variety of functions in the update monitoring server 6.

The CPU 10 reads an operating system program and an update monitoring program, later described, stored in the hard disk drive 12 as appropriate, and loads the RAM 13 with the read programs for execution. Then, the CPU 10 is connected to the Internet 5 through the network interface 14 to communicate data between the note personal computer 2 and the home page server 7 through the Internet 5.

The update monitoring server 6 totalizes update monitoring setting information transmitted from the respective note personal computers 2. Specifically, the update monitoring server 6 generates an entry 101 by adding latest update date/time information 101B indicative of the date and time at which the home page data of a monitored URL 101A was updated at the last time to the monitored URL 101A and update notice destination 101C described in the update monitoring setting information, as shown in FIG. 3. Then, the update monitoring server 6 totalizes the entries 101 to generate an update monitoring table 100 which is stored in the hard disk drive 12.

Then, the update monitoring server 6 operates in accordance with the update monitoring program to access each home page server 7 at a predetermined timing based on the update monitoring table 100 (for example, every hour) to monitor whether the monitored home page has been updated, and, when the monitored home page has been updated, transmits an update notification message to the digital mobile telephone 3 which has been set as the update notice destination.

Figure 4:
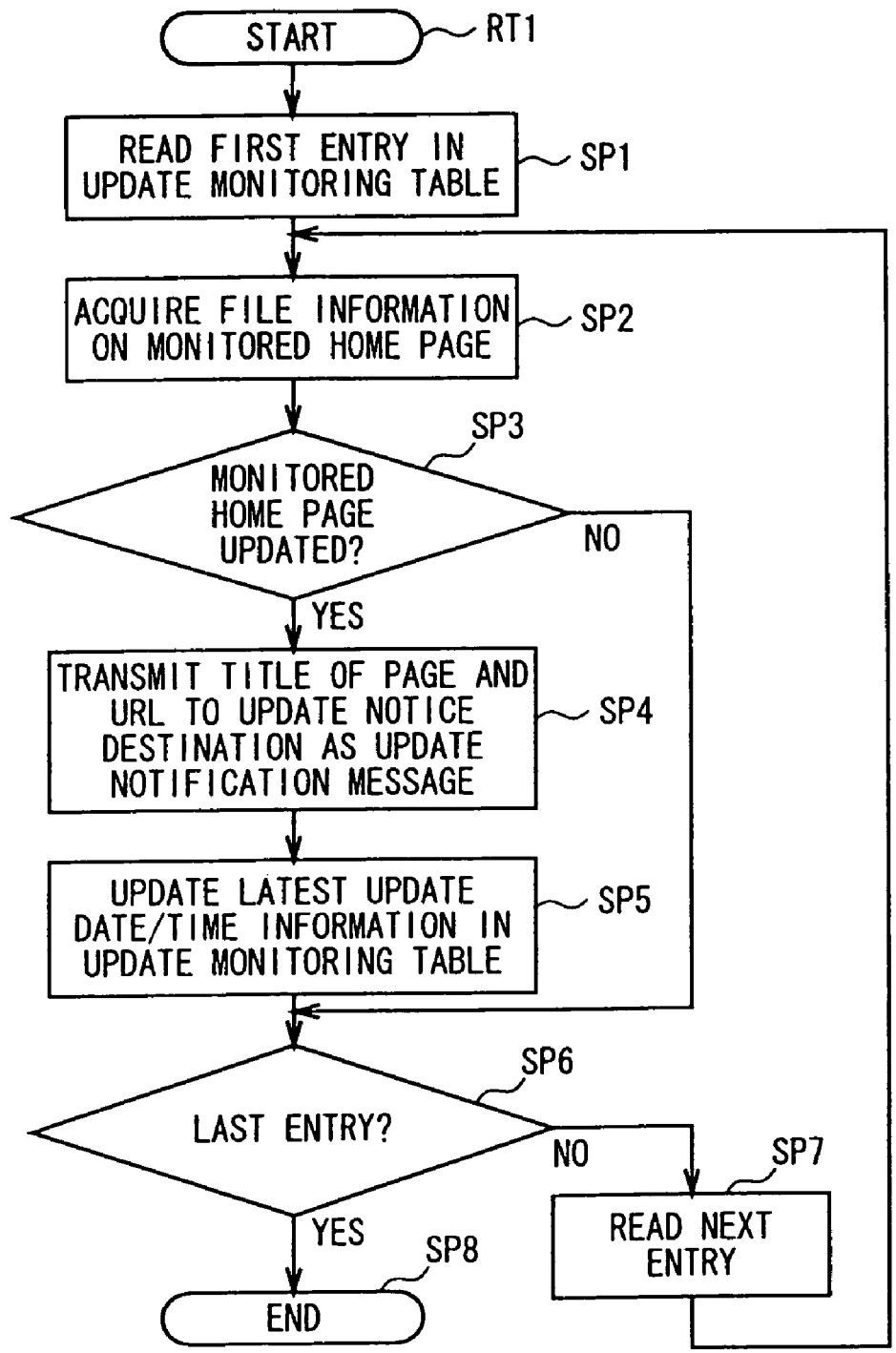
FIG. 4 is a flow chart illustrating an update monitoring process routine.

Specifically, in an update monitoring process routine illustrated in FIG. 4, the update monitoring server 6 enters from the starting step of the routine RT1 and proceeds to step SP1. At step SP1, the CPU 10 reads the first entry 101 of the update monitoring table from the hard disk drive 12, and proceeds to next step SP2.

At step SP2, the CPU 10 connects to the home page server 7 based on the monitored URL 101A described in the read entry 101 to acquire file information on the monitored home page, and proceeds to next step SP3.

At step SP3, the CPU 10 compares the file update date/time of the acquired file information with the latest update date/time information 101B to determine whether or not the monitored home page has been updated.

If a negative result is returned at step SP3, this means that the file update date/time information is identical to the latest update date/time information 101B, or the latest update time/date information 101B is later than the file update time/date so that the monitored home page is not updated, followed by the CPU 10 proceeding to step SP6.

Conversely, if an affirmative result is returned at step SP3, this means that the file update date/time is later than the latest update date/time information 101B so that the monitored home page has been updated, followed by the CPU 10 proceeding to next step SP4.

At step SP4, the CPU 10 transmits the monitored URL 101A and a home page title described in the file information, as an update notification massage, to the digital mobile telephone 3 specified by the update notice destination 101C, and proceeds to next step SP5.

At step SP5, the CPU 10 updates the latest update date/time 101B of the read entry with the acquired file update time/date, and writes the updated entry into the hard disk drive 12, and proceeds to next step SP6.

At step SP6, the CPU 10 determines whether or not the read entry 101 is the last entry in the update monitoring table.

If a negative result is returned at step SP6, this means that the read entry 101 is not the last entry in the update monitoring table, causing the CPU 10 to proceed to step SP7, where the CPU 10 reads the next entry 101 in the update monitoring table from the hard disk drive 12, and then returns to step SP2.

Conversely, if an affirmative result is returned at step SP6, this means that the read entry is the last entry 101 in the update monitoring table so that the CPU 10 has processed all entries 101 in the update monitoring table, causing the CPU 10 to proceed to next step SP8 to terminate the processing.

In this way, the update monitoring server 6 monitors whether monitored home pages have been updated based on the update monitoring table 100 every predetermined time, and, when an monitored home page has been updated, transmits an update notification message to the digital mobile telephone 3 specified as the update notice destination.

(1-2) Configuration of Digital Mobile Telephone

Figure 5:
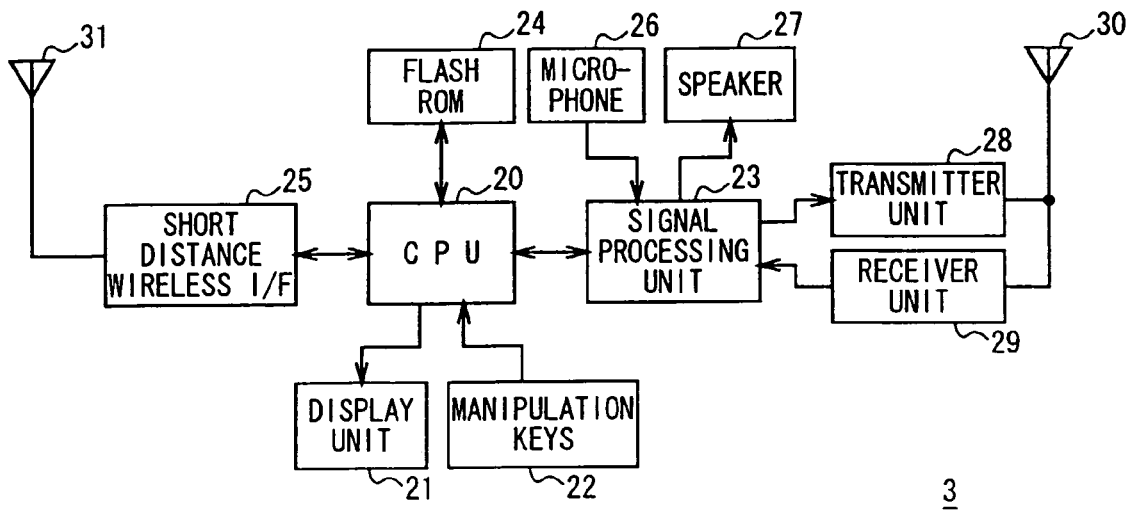
FIG. 5 is a block diagram illustrating the circuit configuration of a digital mobile telephone.

As illustrated in FIG. 5, the digital mobile telephone 3 has a configuration in which a display unit 21 comprised of a liquid crystal display; a plurality of manipulation keys 22; a signal processing unit 23; a flash read only memory (ROM) 24; and a short distance wireless interface 25 conforming to the Bluetooth standard are connected to a CPU 20 for controlling the operation of the entire digital mobile telephone 3. Further, a microphone 26, a speaker 27, a transmitter unit 28 and a receiver unit 29 are connected to the signal processing unit 23.

The CPU 20 displays a variety of information (for example, an entered telephone number, menu items, transmission log, telephone directory, and so on) on the display unit 21 in accordance with instruction information entered through the manipulation keys 22. The CPU 20 also controls the signal processing unit 23 in accordance with instruction information entered through the manipulation keys 22 to execute a variety of processing in accordance with the instruction information such as call origination, call termination, or the like.

Actually, the digital mobile telephone 3 is a CDMA (Code Division Multiple Access) cellular mobile telephone in accordance with a DS (Direct Sequence) scheme which supports the IS95 standard. During a call, the signal processing unit 23 performs CRC (Cyclic Redundancy Check) based error correction on a speech signal entered from the microphone 26, and then performs convolution encoding on the resulting speech signal. Further, the signal processing unit 23 multiplies the convolution encoded speech signal by a PN (Pseudo-Noise) code for frequency spreading, and then QPSK (Quadrature Phase Shift Keying) modulates the spread signal to generate a transmit symbol stream which is inputted to the transmitter unit 28. The transmitter unit 28 digital-to-analog converts the transmit symbol stream to generate a transmit signal, frequency converts the transmit signal, and amplifies the frequency converted transmit signal which is finally transmitted through an antenna 30.

On the other hand, the receiver unit 29 amplifies a received signal received through the antenna 30, frequency converts the received signal, and then analog-to-digital converts the resulting received signal to generate a received symbol stream which is inputted to the signal processing unit 23. The signal processing unit 23 QPSK demodulates the received symbol stream, and multiplies the demodulated symbol stream by a PN code for despreading. Further, the signal processing unit 23 uses convolution encoding for most likely sequence estimation, and performs CRC based error detection to generate a speech signal which is outputted through the speaker 27.

Also, the signal processing unit 23 transmits a control signal to the base station 4 (FIG. 1) through the transmitter unit 28 and the antenna 30 under control of the CPU 20 for call origination, and receives an incoming signal through the antenna 30 and the receiver unit 29, and notifies the CPU 20 of the incoming signal.

The CPU 20 controls the signal processing unit 23 to make wireless data communications with another communication terminal connected to a public network or the Internet 5 through the transmitter unit 28, receiver unit 29 and antenna 30.

Also, the CPU 20 controls the short distance wireless interface 25 to make wireless data communications with the nearby note personal computer 2 (FIG. 1), which supports Bluetooth, through an antenna 31, and transmits a wake-up signal to the note personal computer 2 in response to a depression on a PC wake-up button (not shown) provided in the manipulation keys 22 so that the note personal computer 2 in a sleep mode can be woken up.

Further, the CPU 20 exchanges communication data between the signal processing unit 23 and the short distance wireless interface 25, thereby enabling wireless data communications to be made between the note personal computer 2 and another communication terminal connected to a public network through the digital mobile telephone 3.

In addition, upon receipt of an update notification message transmitted from the update monitoring server 6, the digital mobile telephone 3 is responsive thereto to display the contents of the update notification message on the display unit 21, and to notify the user that the update notification message has been received with predetermined message incoming sound generated from the speaker 27, in accordance with a home page update notification program stored in the flash ROM 24.

Figure 6:
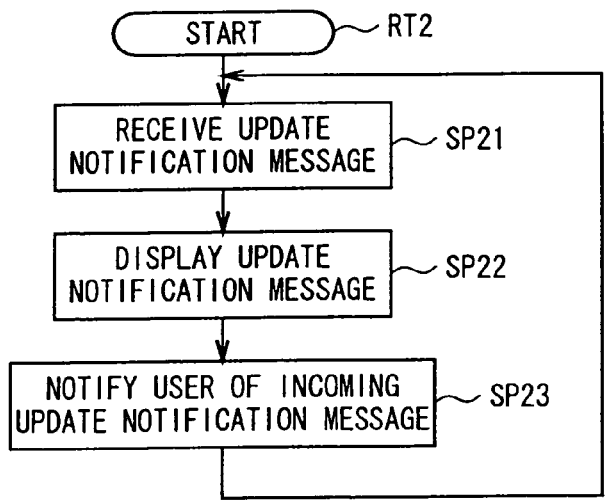
FIG. 6 is a flow chart illustrating a home page update notification process routine.

Specifically, in a home page update notification process routine illustrated in FIG. 6, the digital mobile telephone 3 enters from the starting step of the routine RT2, and proceeds to step SP21. At step SP21, upon receipt of an update notification message from the update monitoring server 6, the CPU 20 proceeds to next step SP22.

At step SP22, the CPU 20 displays the contents of the received update notification message (monitored URL 101A and home page title) on the display unit 21, and proceeds to next step SP23.

At step SP23, the CPU 20 notifies the user that the update notification message has been received with predetermined message incoming sound generated from the speaker 27, and returns to step SP21.

In this way, the digital mobile telephone 3 displays the update notification message in response to the receipt thereof, and generates the message incoming sound to notify the user that the update notification message has been received.

In this state, when user is going to view the home page indicated by the update notification message, the user presses the PC wake-up button on the digital mobile telephone 3.

The digital mobile telephone 3, in accordance with a home page update notification program, adds the monitored URL 101A described in the update notification message to a wake-up signal for transmission to the note personal computer 2 in response to a depression on the PC wake-up button while the update notification message is being displayed.

In this way, the digital mobile telephone 3 wakes up the note personal computer 2 from the sleep mode, allowing the note personal computer 2 to download updated home page data indicated by the monitored URL 101A for displaying the updated home page data thereon.

Figure 7:
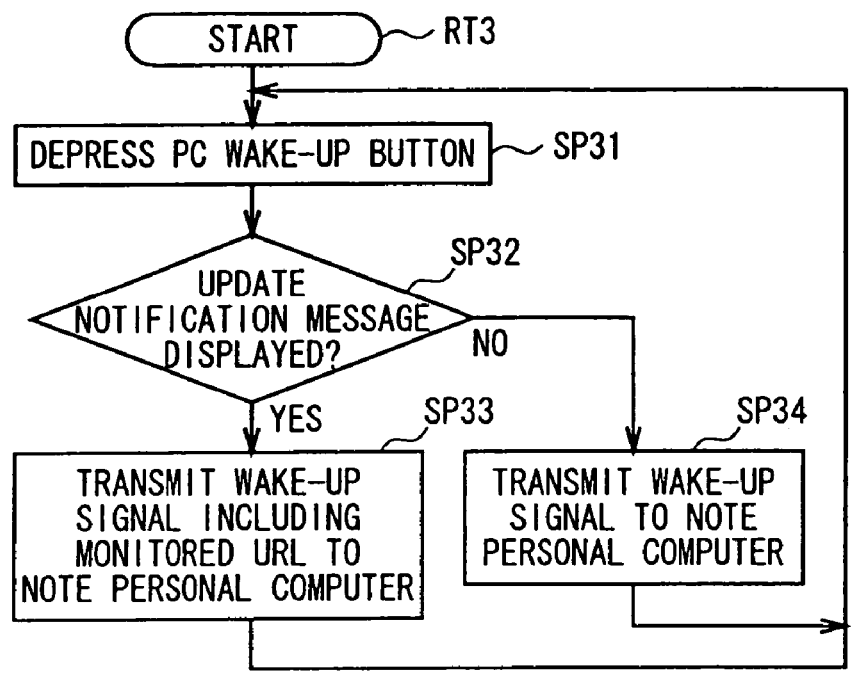
FIG. 7 is a flow chart illustrating a PC wake-up process routine.

Specifically, in a PC wake-up process routine illustrated in FIG. 7, the digital mobile telephone 3 enters from the starting step of the routine RT3 and proceeds to step SP31. At step SP31, the CPU 20 proceeds to next step SP32 in response to a depression on the PC wake-up button.

At step SP32, the CPU 20 determines whether or not an update notification message is being displayed on the display unit 21. If a negative result is returned at step SP32, this means that no update notification message is being displayed on the display unit 21, i.e., any of monitored home pages is not updated, causing the CPU 20 to proceed to step SP34, where only a wake-up signal is transmitted to the note personal computer 2, followed by the CPU 20 returning to step SP31.

Conversely, if an affirmative result is returned at step SP32, this means that an update notification massage is being displayed on the display unit 21, i.e., any of monitored home pages has been updated, causing the CPU 20 to proceed to step SP34, where the CPU 20 transmits a wake-up signal with the monitored URL 101A added thereto (referred to as the "download instructing signal") to the note personal computer 2, and returns to step SP31.

(1-3) Configuration of Note Personal Computer

Figure 8:
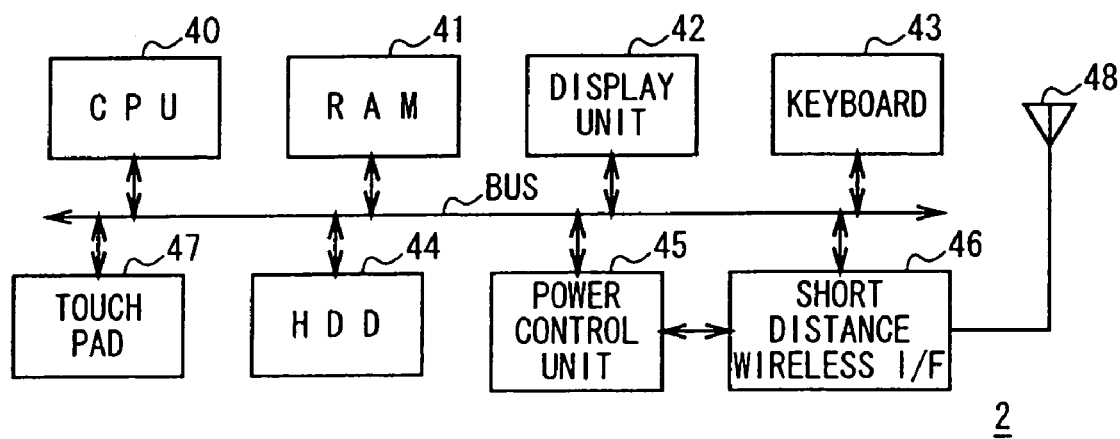
FIG. 8 is a block diagram illustrating the circuit configuration of a notebook type personal computer.

As illustrated in FIG. 8, the personal computer 2 has a configuration in which a CPU 40; a random access memory (RAM) 41; a display unit 42 comprised of a liquid crystal display; a keyboard 43; a hard disk drive 44; a power control unit 45; a short distance wireless interface 46 conforming to the Bluetooth standard; and a touch pad 47 are connected to a data bus BUS.

The hard disk drive 44 stores an operating system program such as Windows 98 (a trademark of Microsoft Corporation) or the like, and a variety of application programs such as an updated home page data acquisition program, later described, and so on.

The CPU 40 reads a program stored in the hard disk drive 44 as appropriate into the RAM 41 for running the read program to perform a variety of processing, wherein the CPU 40 controls respective circuit units in the note personal computer 2 in accordance with the processing, and displays the result of the processing on the display unit 42.

The power control unit 45 controls power supply to respective circuit units of the note personal computer 2, and supplies the power to the short distance wireless interface 37 at all times even when the note personal computer 2 is in the sleep mode.

The short distance wireless interface 46 makes wireless data communications with the digital mobile telephone 3 (FIG. 1), which is a nearby Bluetooth supporting device, through an antenna 48. It should be noted that the short distance wireless interface 46 is operative at all times even when the note personal computer 2 is in the sleep mode. Upon receipt of a wake-up signal from the digital mobile telephone 3 in the sleep mode, the short distance wireless interface 46 responsively outputs a wake-up instruction to the power control unit 45 to start supplying the power to the respective circuit units, which constitute the note personal computer 2, to wake up the note personal computer 2.

In addition to the foregoing configuration, the note personal computer 2 is configured to rely on the updated home page data acquisition program, such that upon receipt of a wake-up signal with the additional update monitored URL 101A, i.e., a download instructing signal from the digital mobile telephone 3, the note personal computer 2 downloads home page data indicated by the update monitored URL 101A from the home page server 7 through the digital mobile telephone 3 for display on the display unit 42.

Figure 9:
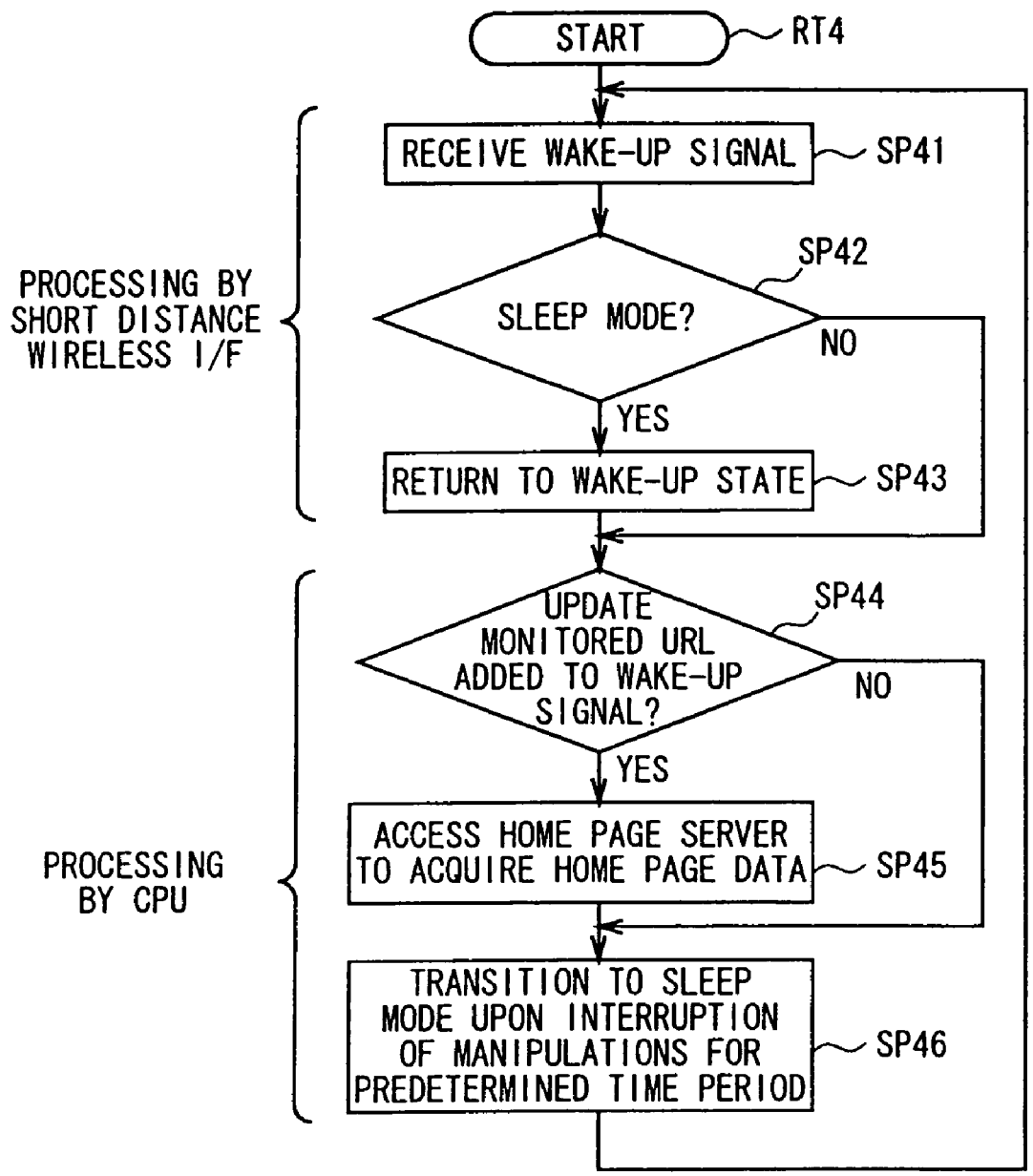
FIG. 9 is a flow chart illustrating an update home page data acquisition process routine.

Specifically, in the updated home page data acquisition process routine illustrated in FIG. 9, the note personal computer 2 enters from the starting step of the routine RT4, and proceeds to step SP41. At step SP41, the short distance wireless interface 46 receives a wake-up signal transmitted from the digital mobile telephone 3, and proceeds to next step SP42.

At step SP42, the short distance wireless interface 46 determines whether or not the note personal computer 2 is operating in the sleep mode. If a negative result is returned at step SP42, this means that the note personal computer 2 is not operating in the sleep mode, i.e., the note personal computer 2 has been woken up, causing the short distance wireless interface 46 to proceed to next step SP44.

Conversely, if an affirmative result is returned at step SP42, this means that the note personal computer 2 is operating in the sleep mode, causing the short distance wireless interface 46 to proceed to step SP34.

At step SP43, the short distance wireless interface 46 outputs a wake-up instruction to the power control unit 36, forcing the power control unit 36 to start supplying the power to the respective circuit units which constitute the note personal computer 2, to wake up the note personal computer 2.

Next, at step SP44, the CPU 40 determines whether or not the received wake-up signal includes an update monitored URL 101A added thereto, i.e., whether or not the note personal computer 2 has received a download instructing signal. If a negative result is returned at step SP44, this means that no update monitored URL 101A is added to the wake-up signal, i.e., no download instructing signal is received, causing the CPU 40 to proceed to step SP46.

Conversely, if an affirmative result is returned at step SP44, this means that the update monitored URL 101A is added to the wake-up signal, i.e., the download instructing signal has been received, causing the CPU 40 to proceed to step SP45.

At step SP45, the CPU 40 accesses the home page server 6 based on the update monitored URL 101A, acquires home page data from the home page server 6, displays the home page data on the display unit 42, and proceeds to next step SP46.

At step SP46, the CPU 40 monitors the keyboard 43 and the touch pad 47 for entry manipulations thereon, and brings the note personal computer 2 into the sleep mode when such entry manipulations are interrupted for a predetermined time period. Then, the CPU 40 returns to step SP41.

In this way, the note personal computer 2 downloads and displays the home page data indicated by the update monitored URL 101A in response to the download instructing signal.

(2) Operation and Effect of Embodiment

In the configuration described above, the monitoring server 6 accesses the home page server 7 based on an update monitoring table to monitor each of monitored home pages for its update situation, and transmits an update notification massage to the digital mobile telephone 3 corresponding thereto if the monitored home page has been updated.

The digital mobile telephone 3 displays the received update notification message to notify the user that the monitored home page has been updated. Then, the digital mobile telephone 3 transmits a download instructing signal to the note personal computer 2 in response to a manipulation of the user, causing the note personal computer 2 to download home page data of the updated monitored home page.

According to the foregoing configuration, the note personal computer 2 need not access the home page server only for confirming whether an intended home page has been updated, and can download only the recently updated home page data in response to the download instructing signal transmitted from the digital mobile telephone 3.

Also, the user can rapidly know that a monitored home page has been updated by the update notification message transmitted by the update monitoring server 6 to the digital mobile telephone 3 which is carried by the user at all times. In addition, the user can readily download the updated home page to the note personal computer 2 only by depressing the PC wake-up button on the digital mobile telephone 3.

(3) Other Embodiments

In the foregoing embodiments, after the digital mobile telephone 3 has received and displayed an update notification message, the digital mobile telephone 3 transmits the download instructing signal to the note personal computer 2 in response to a manipulation of the user. The present invention, however, is not limited to this manner of transmitting the download instructing signal. Alternatively, upon receipt of the update notification message, the digital mobile telephone 3 may responsively transmit the download instructing signal to the note personal computer 2. In this case, the note personal computer 2 can more rapidly download home page data.

Also, in the foregoing embodiment, the personal computer 2 downloads home page data in response to the download instructing signal. The present invention, however, is not limited to the downloading of data into the note personal computer 2. Alternatively, the home page data may be downloaded to a desk top type personal computer, or a variety of information processing apparatus such as PDA.

Further, in the foregoing embodiment, the note personal computer 2 downloads home page data in response to the download instructing signal. The present invention, however, is not limited to the downloading of home page data, but a variety of contents, for example, music data, image data, programs, and so on may be downloaded.

Further, while the foregoing embodiment employs a short distance wireless interface conforming to the Bluetooth standard as communication means between the digital mobile telephone 3 and the note personal computer 2, the present invention is not limited to this particular interface but may employ a variety of communication means, for example, a short distance wireless communication such as Home RF defined by IEEE (Institute of Electrical and Electronics Engineers) 802, an infrared communication conforming to the IrDA (Infrared Data Association) standard, and so on to connect the digital mobile telephone 3 with the note personal computer 2. Further alternatively, a wired interface such as a universal serial bus (USB) or the like may be used to connect the digital mobile telephone 3 with the note personal computer 2. In addition, the digital mobile telephone 3 may be contained in the note personal computer 2.

Further, while the foregoing embodiment employs a CDMA-based cellular mobile telephone as the digital mobile telephone 3, the present invention is not limited to the CDMA, but may employ mobile telephones of a variety of schemes, for example, a W (Wideband)-CDMA scheme, a time division multiple access (TDMA) scheme, an IMT-2000 (International Mobile Telecommunication System) scheme, which is a mobile telephone scheme of the next generation, and so on.

Further, in the foregoing embodiment, the digital mobile telephone 3 receives the update notification message and transmits the download instructing signal to the note personal computer 2. The present invention, however, is not limited to the digital mobile telephone 3 which receives the update notification message and transmits the download instructing signal. Alternatively, any of various mobile communication terminals may be used as long as it is capable of receiving and displaying the update notification message from the monitoring server 6 and transmitting the download instructing signal to the note personal computer 2, for example, a pager having a short distance wireless interface and so on.

Further, in the foregoing embodiment, the note personal computer 2 downloads home page data through the digital mobile telephone 3 in response to the download instructing signal. The present invention, however, is not limited to this manner of downloading the home page data. Alternatively, the home page data may be downloaded through a wired line such as a wired telephone line, a dedicated line, or the like.

Further, in the foregoing embodiment, the CPU 10 in the update monitoring server 6 monitors whether a monitored home page has been updated and transmits the update notification message in accordance with the update monitoring program which has been previously stored in the hard disk drive 12, while the CPU 31 of the note personal computer 2 downloads the monitored home page in accordance with the updated home page data acquisition program which has been previously stored in the hard disk drive 44. The present invention, however, is not limited to this manner of downloading the monitored home page. Alternatively, the update monitoring program or the update home page data acquisition program may have been stored in a variety of program storing media such that the update monitoring program or the updated home page data acquisition program is installed into the update monitoring server 6 or the note personal computer 2 using any of the program storing media.

As described above, for the program storing media for installing the update monitoring program or the updated home page data acquisition program into the update monitoring server 6 or the note personal computer 2 so that the program is executable thereon, not only package media, for example, a floppy disk, a digital video disc-read only memory (DVD-ROM)) and so on, but also a semiconductor memory, a magnetic disk, and so on, which temporarily or permanently store the programs, may be used for implementation. Also, means for storing the update monitoring program or the update home page data acquisition program on these program storing media may be implemented by wired and wireless communication media such as a local area network, the Internet, digital satellite broadcasting and so on. Alternatively, the programs may be stored with a variety of intervening interfaces such as a router, a modem, and so on.

Further, in the foregoing embodiment, the CPU 20 in the digital mobile telephone 3 displays the update notification message and transmits the download instructing signal in accordance with the home page update notification program which has been previously stored in the flash ROM 24. The present invention, however, is not limited to the storage of the home page update notification program in the flash ROM 24. Alternatively, the home page update notification program may be stored in a variety of program storing media, such that any of the program storing media is used to install the home page update notification program into the digital mobile telephone 3.

Thus, for the program storing media for installing the aforementioned home page update notification program into the digital mobile telephone 3 so that the program is executable thereon, not only package media, for example, a floppy disk, digital video disc-read only memory (DVD-ROM) and so on, but also a semiconductor memory, a magnetic disk, and so on, which temporarily or permanently store the programs, may be used for implementation. Also, means for storing the update monitoring program or the update home page data acquisition program on these program storing media may be implemented by wired and wireless communication media such as a local area network, the Internet, digital satellite broadcasting and so on. Alternatively, the programs may be stored with a variety of intervening interfaces such as a router, a modem, and so on.

As described above, according to the present invention, since the update monitoring apparatus monitors the contents to transmit an update notification signal in response to an update to the contents, the server need not be frequently accessed by an information processing apparatus only for confirming whether the contents have been updated. Also, since the update notification signal is transmitted to a mobile communication terminal carried by the user at all times, the user can be rapidly notified that the contents have been updated.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A remote communication terminal comprising:
   communication means for connecting over a communication circuit network to perform communications;
   notifying means for notifying a user of the remote communication terminal with an update notification signal that has been received over said communication circuit network, said received update notification signal indicating that contents being monitored by a remote monitoring apparatus have been updated;
   means for generating an acquisition instructing signal;
   transmitting means for transmitting the acquisition instructing signal to a prescribed information processing means remote from the remote communication terminal, said prescribed information processing means responding to the received acquisition instructing signal for instructing acquisition of said contents that have been updated to update contents at the prescribed information processing means.

2. The remote communication terminal according to claim 1, wherein said notifying means shows on a display screen that said contents have been updated.

3. The remote communication terminal according to claim 1, wherein said acquisition instructing signal includes data indicating at least locations of said contents.

4. The remote communication terminal according to claim 1, wherein said acquisition instructing signal is a download instructing signal, said contents that have been updated are located at a server having a location indicated in the download instructing signal and said information processing means accesses said server through said communication means to download said contents that have been updated according to the received download instructing signal and said transmitting means transmits said download contents to said prescribed information processing means from said communication means.

5. The remote communication terminal according to claim 1, further comprising operation inputting means for instructing transmission of said acquisition instructing signal.

6. An update notification system, comprising:
   a remote communication terminal configured to notify a user with an update notification signal that contents being monitored have been updated, said update notification signal being received by the remote communication terminal from a communication circuit network, said remote communication terminal being further configured to transmit an acquisition instructing signal to instruct acquisition of said contents that have been updated from a prescribed server identified by data making up the acquisition instructing signal, said acquisition instructing signal being transmitted to a prescribed information processing apparatus separate from the remote communication terminal; and
   an update monitoring apparatus configured to store data indicating at least locations of said contents being monitored and a communication identifier of said remote communication terminal, said update monitoring apparatus being further configured to transmit said update notification signal to said remote communication terminal over said communication circuit network when said contents are determined to have been updated, wherein the prescribed information processing apparatus receiving said acquisition instructing signal transmitted from said remote communication terminal is further configured to acquire said contents that have been updated from said prescribed server based on said acquisition instructing signal to update contents at the prescribed information processing apparatus.

7. A contents acquisition instructing method, comprising steps of:

receiving an update notification signal at a remote terminal over a communication circuit network indicating that contents stored in a prescribed server have been updated;

notifying a user of the remote terminal based upon said received update notification signal that said contents have been updated; and transmitting an acquisition instructing signal from the remote terminal to a prescribed information processing apparatus separate from the remote terminal, the acquisition instructing signal identifying the prescribed server and instructing acquisition of said contents that have been updated from the prescribed server to be provided to the prescribed information processing apparatus separate from the remote terminal; and downloading said contents that have been updated from the prescribed server to the prescribed information processing apparatus separate from the remote terminal according to the acquisition instructing signal to update contents at the prescribed information processing apparatus.

* * * * *